E. L. SMITH.
WRAPPING AND BANDING MACHINE.
APPLICATION FILED JUNE 3, 1915.

1,298,807.

Patented Apr. 1, 1919.
6 SHEETS—SHEET 1.

Witnesses:

Inventor:

E. L. SMITH.
WRAPPING AND BANDING MACHINE.
APPLICATION FILED JUNE 3, 1915.
1,298,807.
Patented Apr. 1, 1919.
6 SHEETS—SHEET 2.
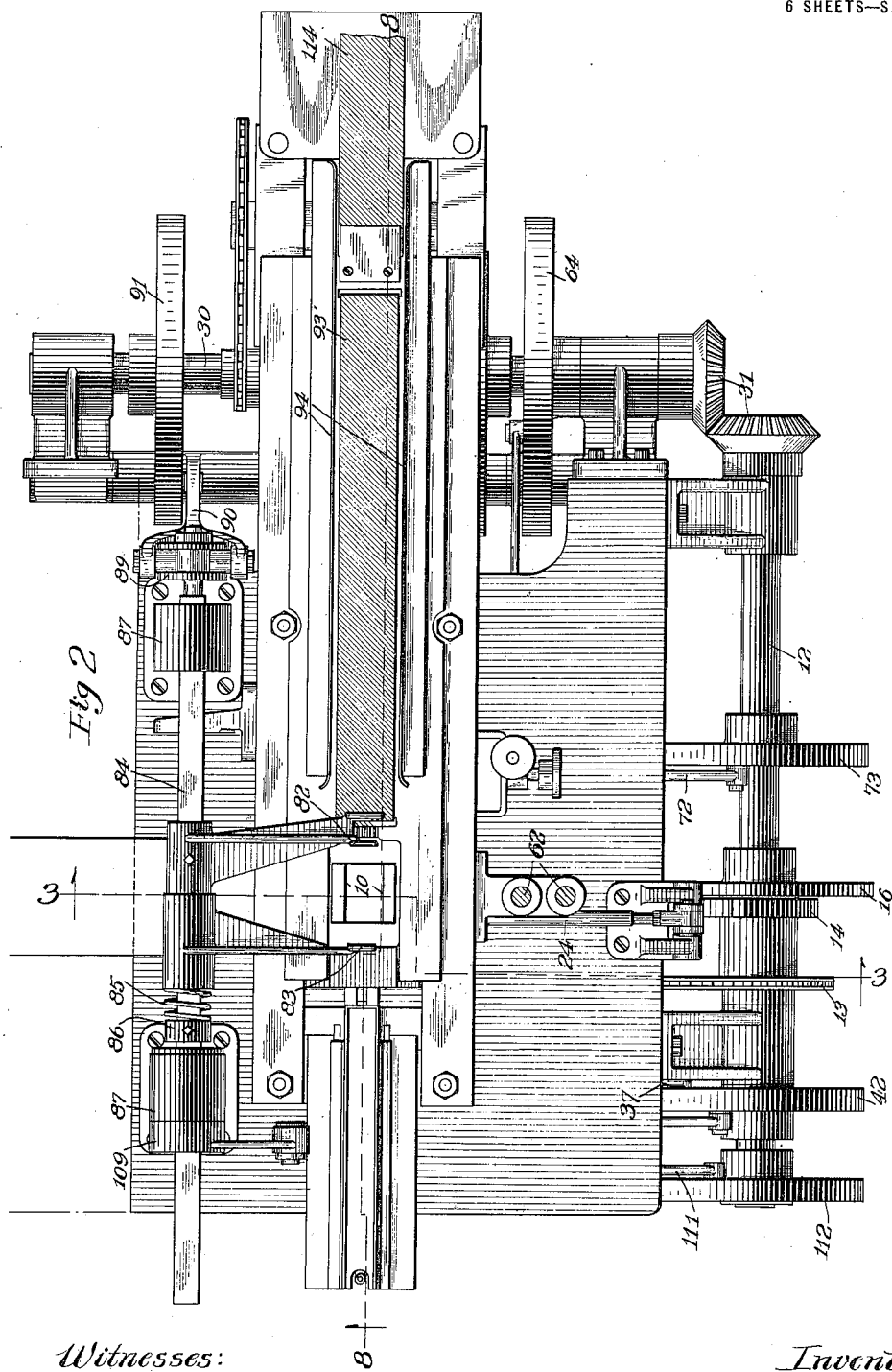
Witnesses:
Inventor
Elmer L. Smith E. L. SMITH.
WRAPPING AND BANDING MACHINE.
APPLICATION FILED JUNE 3, 1915.
1,298,807.
Patented Apr. 1, 1919.
6 SHEETS—SHEET 3.
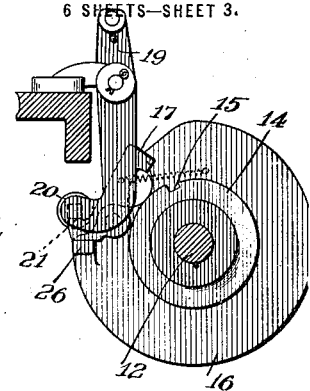
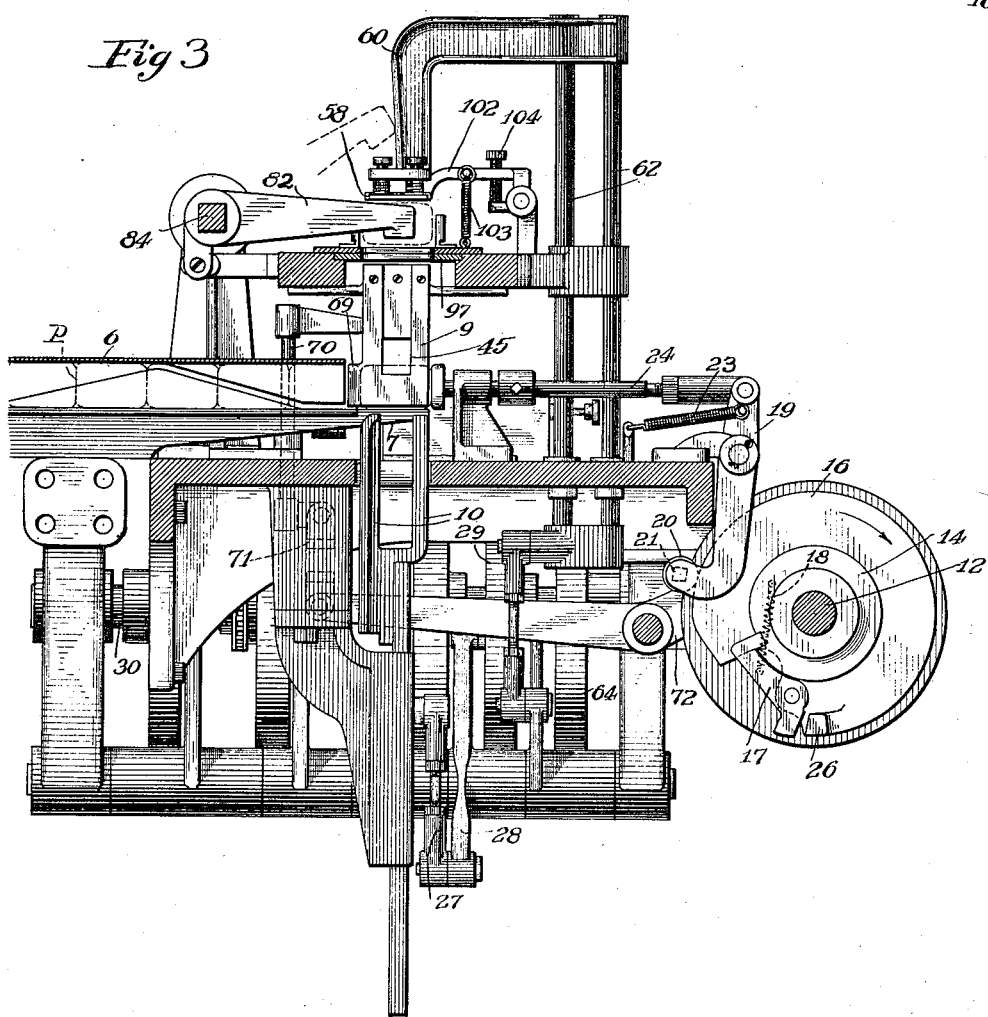

E. L. SMITH.
WRAPPING AND BANDING MACHINE.
APPLICATION FILED JUNE 3, 1915.

1,298,807.

Patented Apr. 1, 1919.
6 SHEETS—SHEET 4.

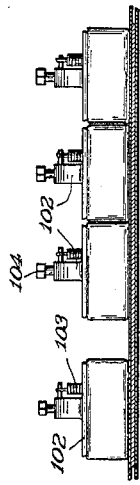

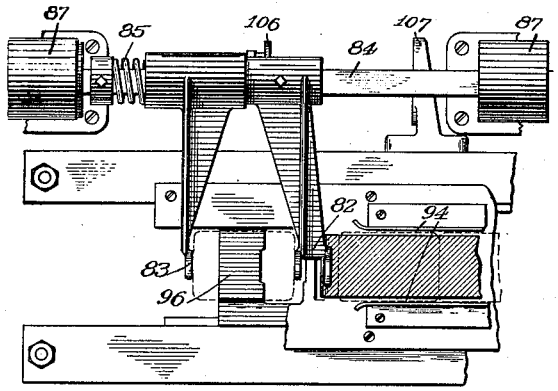
Fig. 11
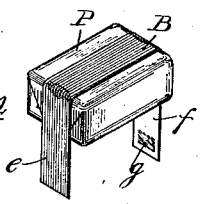
Fig. 14
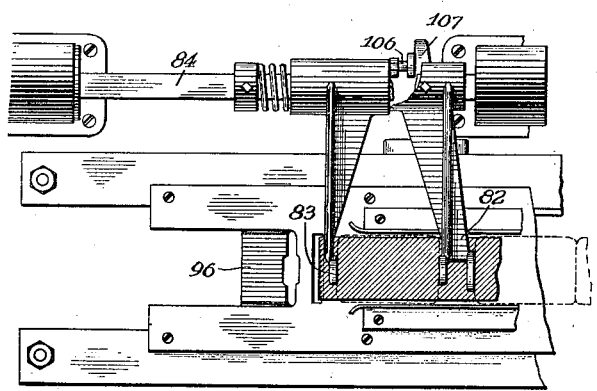
Fig. 12
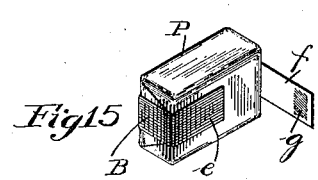
Fig. 15
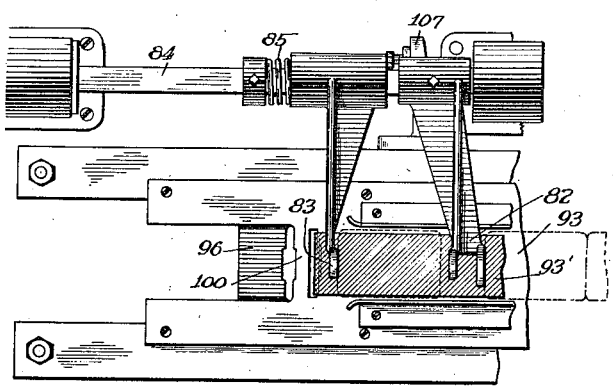
Fig. 13
Fig. 16

UNITED STATES PATENT OFFICE.

ELMER L. SMITH, OF SPRINGFIELD, MASSACHUSETTS, ASSIGNOR TO PACKAGE MACHINERY COMPANY, OF SPRINGFIELD, MASSACHUSETTS, A CORPORATION OF MASSACHUSETTS.

WRAPPING AND BANDING MACHINE.

1,298,807.  Specification of Letters Patent.  Patented Apr. 1, 1919.

Application filed June 3, 1915. Serial No. 31,913.

*To all whom it may concern:*

Be it known that I, ELMER L. SMITH, a citizen of the United States, residing at Springfield, in the county of Hampden and State of Massachusetts, have invented certain Improvements in Wrapping and Banding Machines, of which the following description, in connection with the accompanying drawings, is a specification, like reference characters on the drawings indicating like parts in the several figures.

In the preparation of articles for the market it is a very common practice to apply a band, stamp, label or similar article of wrapping material to the article, sometimes merely for ornamental purposes or, as in the case of stamps, for the purpose of complying with the internal revenue laws, but more usually for the purpose of securing in their proper positions the folds of the wrapper in which the article is inclosed and thus producing a more securely wrapped package.

The present invention is directed to mechanism for applying such bands, stamps or similar articles and more particularly to devising a mechanism of this character with which the band or other article of wrapping material can be accurately alined on the package. The invention also aims to provide, in those cases in which it is desired to have the band encircle any substantial part of the package, means for affixing the band tightly to the package. It is a further object of the invention to devise means for neatly handling and applying glue to the bands or other articles which are to be so affixed and to devise means for preventing the feeding of the bands when no package is present to receive them.

For convenience, the term "package" will be herein used in a generic sense, when the context permits, to designate any article, whether wrapped or not, to which the band, stamp, label or other article of wrapping material is to be applied; and the term "band" will also be used generically to designate the article of wrapping material applied to the package.

A convenient embodiment of the invention will now be described and the manner in which it is proposed to accomplish these objects will be explained, reference being made to the accompanying drawings, in which—

Fig. 2 is a plan view of the banding mechanism showing the parts on a larger scale than Fig. 1;

Fig. 3 is a vertical, sectional view on the plane indicated by the line 3—3, Fig. 2;

Fig. 4 is a side elevation, partly in section, of a detail of construction;

Fig. 8 is a central, vertical, sectional view of the banding mechanism, taken substantially on the plane indicated by the line 8—8, Fig. 2;

Fig. 9 is a perspective view of the package as it is delivered to the banding mechanism;

Fig. 10 is a front elevation of certain parts of the package delivery mechanism;

Figs. 11, 12 and 13 are fragmentary plan views of the mechanism that carries the packages out of the machine, showing different steps in the operation of this mechanism; and Figs. 14, 15 and 16 are perspective views showing various steps in the banding operation.

Figure 1:
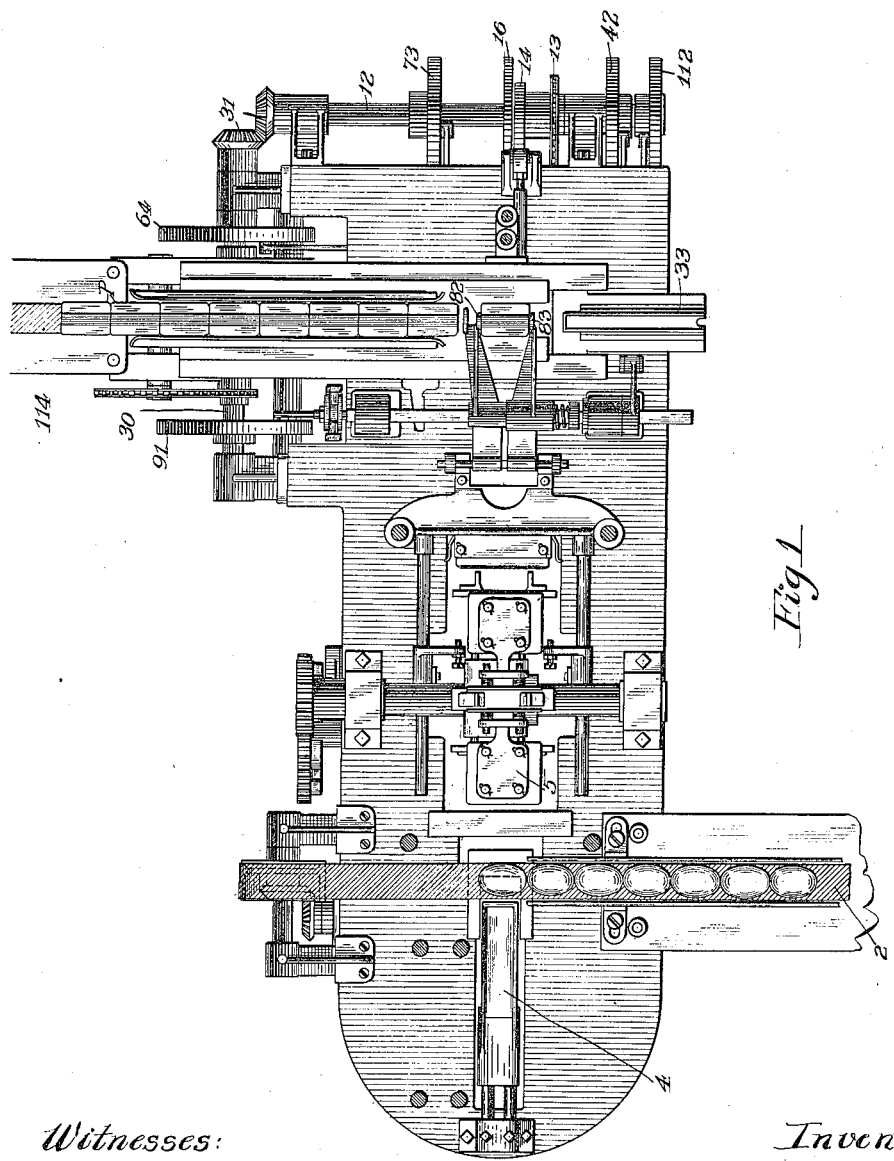
Figure 1 is a plan view showing the general organization of a machine constructed in accordance with the invention, certain parts of the superstructure of the machine being cut away to disclose more clearly the essential features.
Figure 6:
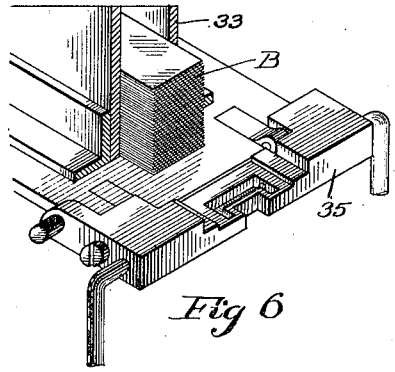
Fig. 6 is a perspective view of a detail of the band feeding mechanism.

The drawings show a banding machine embodying this invention attached to a wrapping machine, the wrapping mechanism being arranged to deliver wrapped packages to the banding mechanism and the latter mechanism then operating to wrap a band tightly about the package in such a manner as to secure the folds of the wrapper in their proper positions. The band, of course, is glued so that it will permanently hold the wrapper in place.

The wrapping mechanism is of the general character disclosed in a co-pending application filed in the name of Milford B. Ferguson, Serial No. 607,592, filed February 9, 1911, now Patent No. 1,187,055, June 13, 1916, and assigned to the assignee of the present invention. Accordingly, this mechanism requires no description here further than to say that the articles to be wrapped, in this instance cakes of soap, are carried to the wrapping machine on a belt 2, Fig. 1, and are pushed one at a time by means of a plunger 4 into the pockets of a tumble box 5, each cake of soap picking up its wrapper or wrappers on the way into the tumble box. This wrapper is folded around the cake while in the tumble box and the cake is then ejected into a folding chute 6, Fig. 3, which makes the end tucks and completes the wrapping operation.

The package, as it emerges from the end of the folding chute 6, appears substantially as indicated at P in Fig. 9. The packages P are pushed through the chute 6 by the ejector of the wrapping mechanism, each package pushing the one in advance of it and the foremost package thus is brought to the end of the chute, the middle of the floor of which is cut away at this point to form two arms or extensions 7 (see Figs. 3 and 8) on which the package rests. The end folds of the package up to this point have been held by the side walls of the chute 6 and when the package is pushed on to the extensions 7 it is moved between two vertical plates 9 which in effect form continuations of the side walls of the chute 6. These plates also constitute a vertical guideway through which the packages are moved one at a time by a vertically operating elevator or plunger 10 forming part of the banding mechanism.

As above stated, mechanism is provided to prevent the feeding of bands when a package is not in position to be banded. In the construction shown, the operation of the entire banding mechanism is stopped whenever the wrapping mechanism fails to deliver a package in position for the plunger 10 to carry it through the banding mechanism. As best indicated in Figs. 1 and 2, the main shaft 12 of the machine is driven by a chain running over a sprocket wheel 13 mounted loosely on said shaft. This sprocket is rotated constantly from a convenient source of power and has fast thereon a single toothed ratchet wheel 14 (see Fig. 3) having a square notch 15 cut in its periphery to form the tooth. Mounted beside the member 14 and fast on the shaft 12 is a cam 16 which carries a pawl or dog 17 pivotally mounted thereon and having connected thereto a spring 18 which serves normally to hold the forward end of the pawl in contact with the periphery of the wheel 14 and thus tends to move this end of the pawl into the notch 15.

Pivoted on the machine frame adjacent to the cam 16 is a lever 19 that carries a roll 20, which runs on the periphery of the cam 16, and a square pin 21 which is adapted at certain times to engage with the tail of the pawl 17. A spring 23 acts on the lever 19 in a direction tending to hold the roll 20 against the periphery of the cam 16 and a horizontal link 24, connected to the upper end of the lever 19 and mounted to slide in suitable guides secured in the machine frame, has a flat head or end that projects into the path of the endmost package as it is moved into the guideway formed by the plates 9 in readiness for the plunger 10 to carry it through the banding mechanism. This package, by pressing on the end of the link 24, will swing the lever 19 in a direction tending to move the roll 20 away from the cam 16. At this time the spring 18 will hold the pawl 17 in the notch 15 of the constantly rotating member 14, thus causing the cam 16 and the shaft 12, which is fast to it, to rotate with the sprocket wheel 13 in the direction indicated by the arrow in Fig. 3. The entire banding mechanism thus is in operation at this time. If, however, a package is not in the proper relationship to the plunger 10 to be carried thereby through the machine, then the spring 23 will swing the lever 19 in a counter-clockwise direction, as soon as the roll 20 comes opposite the notch in the cam 16 thus moving the square pin 21 into position to strike the tail of the pawl 17, lifting its forward end out of the notch 15 and interrupting the driving connection between the shaft 12 and the sprocket 13. This relationship of the parts is shown in Fig. 4. The movement of the dog produced in this manner tips it back into contact with a lug 26 formed on the cam, and since this lug, the pin 21 and the fulcrum of the lever 19 are substantially in line, these parts serve to stop positively the motion of the cam 16 and the other parts that are driven by this cam.

The plunger 10 is mounted on a plunger rod guided in vertical ways formed in a bracket secured to the machine frame and an adjustable link 27 connects this rod with one end of a lever 28 that is driven by a cam fast on the shaft 30, this shaft being driven through miter gears 31 from the shaft 12. This mechanism gives the plunger 10 its operative movement.

The band feeding mechanism is best shown in Fig. 8. The bands B are stacked in a magazine 33, a needle 34 being provided at the back of the magazine to insure the feeding of one band only at a time. Mounted at the forward end and at the bottom of the magazine is a suction plate 35 which is arranged to deflect the forward end of the lowermost band in the magazine. The operative movement of the suction plate is effected by connections with a cam 42 fast on the shaft 12, these connections including a lever 37 (see Fig. 5) operated by the cam and an adjustable link 36 which connects the lever with the suction plate. Suction is provided by connecting the plate 35 through suitable flexible tubes with a small suction chamber provided between a stationary piston 39 and a movable cylinder 40 sliding over it, a spring 41 being interposed between the two members 39 and 40 and tending to force them apart and thus create the suction. In order to raise the cylinder 40 against the action of the spring 41 and thus relieve the suction, the cam 42 (above mentioned) is arranged to operate a bell crank lever 43, see Fig. 5, and this lever is provided on its free end with a roll which bears against the bottom of the movable cylinder 40. These parts, of course, are designed to raise the cylinder 40 and release it again at the proper points.

As clearly shown in Fig. 8, the walls 9 of the package guideway are each apertured as indicated at 45, and a nipper is mounted to reciprocate through the apertures or ports 45 and grasp the end of a band deflected by the suction plate 35. This nipper comprises a jaw 46, preferably integral with a slide 47 which is mounted in a horizontal guideway permitting the reciprocating movement just mentioned, this slide being operated by a link 48 and lever 49 connected with a cam follower 50 that is operated by a cam 51 fast on the shaft 30. The movable jaw 53 of the nipper is pivoted to the slide 47 and has a tail piece that slides in a guideway formed in a channel bar 54 which is pivoted to a stationary part of the machine. This bar normally is held downwardly by a spring 55 but has an arm 56 depending therefrom and carrying on its lower end a roll which runs on a cam face formed on the periphery of the cam 51. These parts are so timed that, while the plunger 10 is descending after having carried a package through the guideway 9, the nipper 45 will move forward, (the plunger 10 being cut out or made U-shaped as shown in Fig. 3 to permit this movement) and will grasp the end of the bottommost band in the magazine 31, this end having just been bent downwardly by the suction plate 35 in readiness for this operation. The nipper will then close on the band (the cam 51 and parts 56 and 54 effecting this movement) and return to its original position, thus drawing the band out of the magazine and through the ports 45 in the opposite walls of the guideway 9. The stroke of the nipper is made of such a length that it will not draw the band entirely out of the magazine but will leave one end lying under the other bands in the stack. The band thus will be held stretched between the nipper and the magazine across the path that the next package must take in its travel through the guideway 9 and positioned just above the position occupied by a package when delivered to the plunger 10.

While the band is held in this stretched position, the plunger 10 moves the package upwardly into contact with the band and at substantially the same time that this engagement between the band and the package is effected a presser plate 58, supported loosely on pins 59 which project through a presser head 60 and are encircled by springs tending to force the plate downwardly away from the head, is moved down through the guideway into contact with the band and presses the band against the package. This plate preferably is shaped to conform to the upper face of the package and holds the band correctly positioned on the package while the plunger 10 carries the package upwardly through the guideway. The head 60 is supported by a pair of vertical rods 62, which are mounted in suitable guides supported by the frame parts of the machine, and is operated by connections with a cam 64 fast on the shaft 30.

Figure 7:
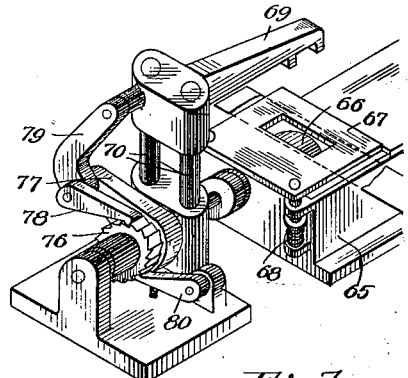
Fig. 7 is a perspective view of certain parts of the gluing mechanism.

The nipper 46 releases the band as soon as it is clamped between the plate 58 and the package and mechanism is provided to apply a spot of glue to the end of the band previously held by the nipper as soon as it is released. This mechanism comprises a glue tank 65 having a glue roll 66 mounted therein and equipped with the usual scraping devices which serve to remove the surplus glue from the peripheral face of the roll. Just above the roll 66 a cover plate 67 is mounted for movement toward or from the tank in a vertical direction but normally is held in its raised position by springs 68, see Fig. 7, which encircle the four pins or posts on which the cover is mounted. A slot is formed in this cover immediately over the upper edge of the glue applying roll 66 and just under the position occupied by the end of the band B where it is released by the nipper 46. The slot in the cover 67 preferably is narrower than the band and a presser foot 69, mounted on a pair of guides 70 slidable vertically in brackets secured to the machine frame, is operated by a link 71 (see Fig. 3) lever 72 and a cam 73 to press the band against the cover 67 and the glue applying wheel 66. Preferably a part of the end of the presser foot 69 is cut out, as shown in Fig. 7, so that it will bear against the band only at opposite sides of the aperture in the cover 67. This presser foot depresses both the band and the cover sufficiently to bring the band into contact with the periphery of the glue wheel. If the presser foot should be operated at any time when a band was not interposed between it and the glue roll, the periphery of the roll would project into the cut out portion of the presser foot and, therefore, would not smear glue on the presser foot.

A ratchet wheel 76 is mounted on the shaft of the glue applying wheel 66 outside of the tank 65 and is arranged to be operated by the mechanism that raises and lowers the presser foot 69. For this purpose a small rock arm 77 is pivoted to the shaft of the wheel 66 and carries a pawl 78 which engages the teeth of the ratchet wheel 76. A link 79 connects the rock arm 77 with the shank of the presser foot 69. Accordingly, when the presser foot is depressed, the link 79 will rock the arm 77, thus carrying the pawl 78 back over the teeth of the ratchet wheel 76 and when the presser foot is again raised the pawl 78 will turn the ratchet wheel and thus will turn the roll 66 to bring a different portion of its surface opposite the aperture in the plate 67. Another pawl 80, pivoted to a stationary bracket, is held in contact with the ratchet wheel 76 by a spring and prevents any backward rotation of the roll 66.

The band has now been clamped on the forward or upper face of the package by the presser plate 58. One end of the band has had a spot of glue applied thereto, and the plunger 10 and presser plate 58 have started up through the guideway 9, thus drawing the other end of the band out of the magazine. This movement of the package folds both ends of the band over the ends of the package, the band being guided in grooves cut for it in the walls of the guideway 9. Immediately above the guideway is a pair of fingers 82 and 83 which are mounted to yield relatively to each other. The plunger 10 and presser plate 58 carry the package P into the grasp of these fingers which operate by their yielding motion to wipe the band tightly over the ends of the package and press the band firmly against these parts of the package. This yielding movement of the fingers 82 and 83 is obtained by mounting the shank of both fingers on a square shaft 84, the fingers 82 being fixed to the shaft and the finger 83 being slidable on the shaft but held yieldingly toward the finger 82 by a spring 85 abutting against a collar 86, Fig. 2, fast on the shaft. These fingers thus can accommodate between them packages varying in length.

The fingers 82 and 83 are employed to aid in carrying the packages one at a time through the machine. As clearly shown in Fig. 2, the square shaft 84 is mounted to slide in two horizontal bearings 87 and is provided at its right hand end, as seen in Fig. 2, with a collar 89 which is engaged by rolls carried in the bifurcated end of a lever arm 90. This lever carries a roll running in a cam path formed in a cam 91 which is fast on the shaft 30. This mechanism serves to carry the fingers 82 and 83 and the package which they hold between them to the right as the parts are seen in Figs. 2 and 8.

When the package is delivered to the fingers 82 and 83, the band is folded about it in the condition shown in Fig. 14, the ends $e$ and $f$ projecting downwardly into the guideway 9. As soon, however, as the plunger 10 has started to withdraw, a folder 96 which is fast on the rearward end of a slide 97 starts forward and folds the end $e$ of the band against the lower or rear face of the package, as shown in Fig. 15. This movement of the folder is produced by means of a cam fast on the shaft 30 operating through a lever 98 and a link 99, Fig. 8, that connects one end of the lever with a depending lug fast on the slide 97.

As soon as the band is folded into the position shown in Fig. 15, the fingers 82 and 83 start forward, moving from the position in which they are shown in Fig. 11 into that in which they appear in Fig. 12. The tucker 96 moves forward with the fingers 82 and 83 for a short distance and holds the end $e$ of the band in its folded position while the opposite end $f$, which has the glue spot applied thereto, is folded over the end $e$ by coming in contact with a stationary folder 100 that lies immediately below the fingers 82, as the parts appear in Fig. 8. The folder 96 then returns to its initial position while the fingers 82 and 83 continue the delivery of the package.

The delivery stroke of the fingers 82 and 83 is made of such a length that they will carry the package between a stationary plate 93 and the first of a series of presser devices 102. Each of these devices consists of a pivoted arm carrying at its forward end a large plate arranged to overlie and press against the packages resting on the plate 93. Each arm is pivoted so that it can have a limited up and down movement and is acted upon by a spring 103 which tends to hold it in contact with the package. A bolt or screw 104, threaded through a part of the arm, is arranged to strike a stationary stop and limit the downward movement of the device. The first one of these presser devices 102 is mounted to overlie the package in the first station into which it is moved by the fingers 82 and 83. This position of the fingers is shown in Fig. 12. The shank of the finger 83 carries a depending lug through which an adjustable stop 106, Fig. 12, is threaded and at this point in the movement of the finger it comes in contact with a stationary stop 107 mounted on the machine frame. Consequently, the movement of the finger 83 is stopped at this point but since the shaft 84 continues to move forward it carries with it the finger 82, this movement continuing far enough to clear the finger from the package as indicated in Fig. 13. Consequently, the fingers 82 and 83 at this point release the package.

Figure 5:
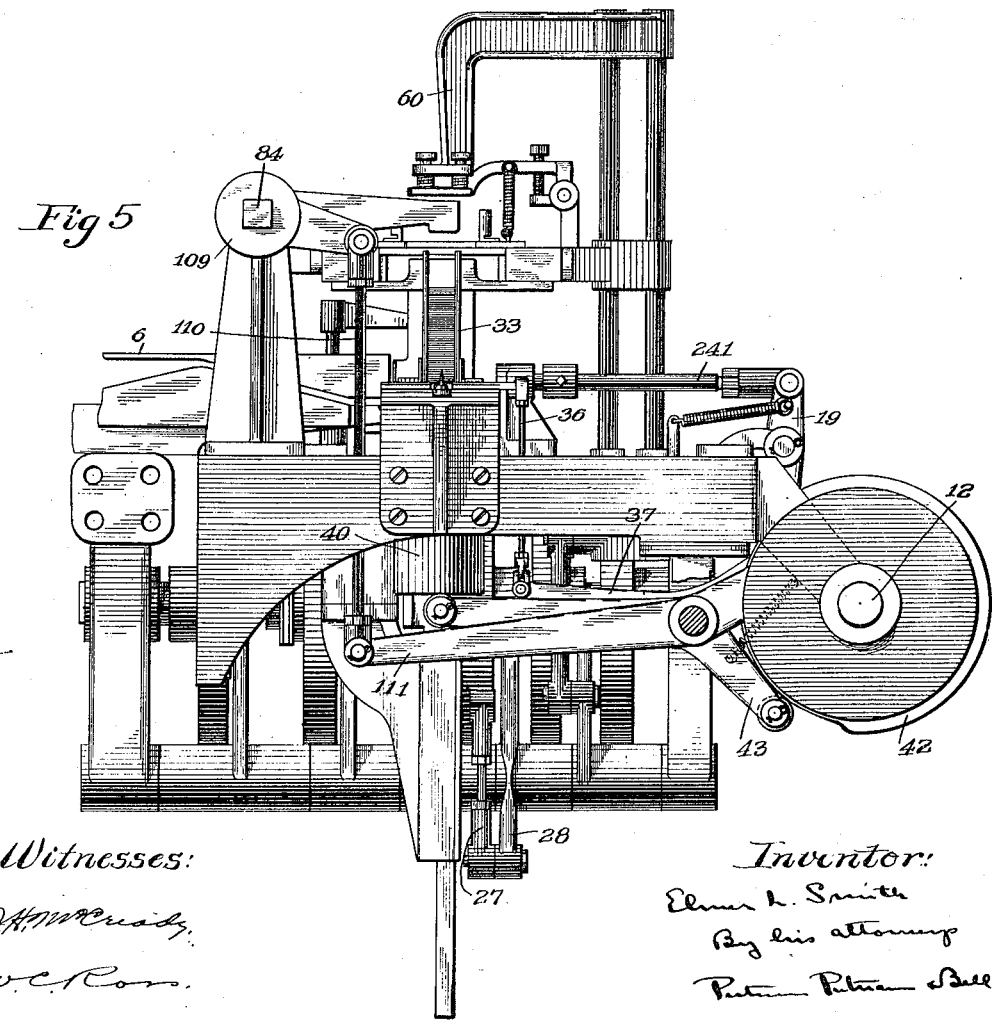
Fig. 5 is an end view of the banding mechanism.

Both the fingers are now swung upwardly far enough to clear the package upon their return stroke. This operation is effected by rocking the shaft 84 in a counter-clockwise direction as the parts are seen in Figs. 3 and 5. The shaft 84 slides through bushings rotatably mounted in the parts 87 and one of these bushings 109 has an arm extending forwardly therefrom that is connected by a long link 110 to a lever 111 which is operated by a cam 112 fast on the shaft 12.

As soon as the shaft 84 has been rocked by this mechanism sufficiently to move the fingers 82 and 83 clear of the package that they have just advanced, the shaft 84 is moved backward until the fingers are again brought into line with the sides of the guideway 9 when the shaft 84 is rocked in a clockwise direction to swing the fingers into a horizontal position in readiness to receive the next package advanced to them by the plunger 10.

As clearly shown in Figs. 11 to 13, the forward finger 82, which is positively operated, is a double finger; that is, it has two package contacting faces so that, as the fingers carry forward another package, the finger 82 will push the preceding package along the plate 93 and under another one of the presser devices 102. In order to facilitate this movement, the plate 93 preferably is covered with a belt of elastic webbing or some textile material which encircles it loosely lengthwise of the plate so that it can travel with the packages. Two guides 94 (see Fig. 2) extend parallel to the plate 93 and on opposite sides of it to guide the packages as they are moved by the fingers 82 and 83. Each package, of course, pushes the one in advance of it until the foremost package reaches the delivery belt 114 which is mounted on suitable pulleys, one of which is driven, so that this belt will convey the packages away from the machine.

The operation of the machine has already been indicated rather fully in the foregoing description. Stated briefly, the operation is as follows: The packages are pushed through the wrapping chute 6 by the ejector of the wrapping mechanism, each package pushing the one in advance of it until finally a package is pushed into the guideway 9 and immediately over the plunger 10. Up to this point the clutch operating mechanism, including the parts 19 and 24, has held the clutch in its inoperative condition but as soon as a package is presented to the plunger 10 in the manner just described, this package will cause the clutch controlling mechanism to release the dog 17, thus rendering the clutch operative and starting the banding mechanism into operation. The nipper 46 already has advanced a band out of the magazine 33, having been left in this condition when the machine was last stopped, and holds the band in substantially the position shown in Fig. 8. The presser plate 58 next descends and strikes the band just as the plunger 10 brings the package into contact with the band, which at this time is held stretched by the nipper. These parts, in cooperation with the band feeding mechanism, thus insure the accurate alinement of the band on the package. The nipper immediately releases the band, the presser foot 69 is depressed by its operating mechanism, thus forcing the band into contact with the periphery of the glue applying roll 66 placing a spot of glue $g$ (see Fig. 14) on the end of the band. The plunger 10 continues to carry the package up through the guideway 9 and delivers it to the fingers 82 and 83 which will be slightly forced apart by the movement of the package between them. The folder 96 next comes forward folding the flap $e$ against the lower face of the package and the fingers 82 and 83 then move toward the right as the parts are seen in Fig. 8, carrying the package over the folder 100 which folds the glued end $f$ of the band over the end $e$. The fingers deliver the package to a point between the plate 93 and the first presser device 102 and are then swung upwardly far enough to clear the package and are moved back again to their initial position in readiness to receive the next package. This cycle of operations is repeated so long as a package is presented in proper position for the plunger 10 to carry it into the banding mechanism but is interrupted as soon as a package fails to come into the proper relationship to the plunger 10.

A particular advantage of this arrangement in handling packages that have just been wrapped is that pressure is kept on the folds and on the band that has been placed over the folds until the glue uniting the ends of the band has had plenty of time to set. The band thus is tightly applied to the package and renders the wrapping of the package secure.

In the arrangement above described in detail the bands used are designed to completely encircle the package but it is obvious that the same principle could be followed and much of the mechanism shown in the drawings could be successfully used in handling bands or stamps of less length.

Having thus described my invention, what I claim as new and desire to secure by Letters Patent of the United States is:

1. In a machine for applying bands to packages, the combination of means for positioning individual bands one at a time constructed and arranged to mechanically grip each band at its ends and to hold it stretched for its application to a package and means for relatively moving a band and a package to bring them into contact with each other while the band is stretched.

2. In a machine for applying bands to packages, the combination of means for positioning bands one at a time and holding each band stretched for its application to a package, means for applying glue to one end only of each band, and means for relatively moving a band and a package to bring them into contact with each other while the band is stretched.

3. In a machine for applying bands to packages, the combination of a band supply, a reciprocating nipper operative to draw bands from said supply one at a time and coöperating with said supply to sustain each band by its ends, and means for applying each band to a package while it is so sustained.

4. In a machine for applying bands to packages, the combination of a band supply, a reciprocating nipper operative to draw bands from said supply one at a time and coöperating with said supply to sustain each band by its ends, a plunger operative to move a package into contact with each band while so sustained, and a presser plate arranged to press each band against the package to which it is applied.

5. In a machine for applying bands to packages, the combination of a magazine for bands, means for feeding bands out of the magazine one at a time including a reciprocating nipper operative to grasp the end of a band and draw it partially out of the magazine and hold it stretched, a plunger operative to move a package transversely into contact with each band while it is so stretched, means for applying glue to the bands and a presser plate coöperating with the plunger to press each band against its package.

6. In a machine for applying bands to packages, the combination of a magazine for bands, means for feeding bands out of the magazine one at a time including a reciprocating nipper operative to grasp the end of a band and draw it partially out of the magazine and hold it stretched, means for applying glue to the bands and means for applying each band to a package while the band is stretched.

7. In a machine for applying bands to packages, the combination with means for moving the packages through the machine one at a time, of means for positioning a band across the path of each package and stretching the band while a package is moved into contact with it, and means for yieldingly pressing the band against the opposite ends of the package.

8. In a machine for applying bands to packages, the combination with means for moving the packages through the machine one at a time, of means for positioning a band across the path of each package and stretching the band while a package is moved into contact with it whereby the band will be stretched tightly across the front face of the package, means constructed to act on packages differing in length to press the band against the opposite ends of the package, and means for folding the ends of the band against the rear face of the package while said pressing means holds the band against the ends of the package.

9. In a machine for applying bands to packages, the combination with a plunger operative to advance the packages one at a time, of means for positioning a band across the path of each package and stretching the band while a package is moved into contact with it, a pair of fingers between which the package is moved by said plunger, said fingers being operative to press the band against opposite ends of the package, and means for operating said fingers to cause them to transfer the package and then to release the package and move back again to receive the next package.

10. In a machine of the character described, the combination of means for feeding wrapping material and a plunger operative to advance packages one at a time to receive said wrapping material, of a pair of fingers mounted for yielding movement relatively to each other and operative to engage opposite faces of a package, said plunger being arranged to move the packages one at a time into the grasp of said fingers, and operating mechanism for said fingers arranged to cause the fingers to transfer the package presented to them by the plunger and then to release the package and swing clear of it and return again in position to receive the next package.

11. In a machine for applying bands to packages, the combination with a band magazine, of a reciprocating nipper, means for moving the end of the bottommost band in the magazine into a position to be grasped by said nipper, means for operating said nipper to cause it to draw the bottommost band partly out of the magazine leaving the end of the band in the magazine and thus holding the band stretched, and means for relatively moving a band and package to bring them into contact with each other while the band is stretched.

12. In a machine of the character described, the combination with a glue applying member, of a cover for said member having an aperture registering with said member, means for positioning a band over said aperture, and a device constructed and arranged to force said band into engagement with said member.

13. In a machine of the character described, the combination with a glue applying roll, of a cover for said roll having an aperture registering with said roll, means for positioning a band over said aperture, and a presser foot constructed to straddle said roll and operative to force said band into engagement with said roll.

14. In a machine of the character described, the combination with a glue applying member, of a depressible cover therefor having an aperture over said member, means for feeding bands over said cover one at a time, and means for depressing the cover and band to bring the part of the band overlying said aperture into contact with said glue applying member.

15. In a machine of the character described, the combination with a glue applying roll and means for supplying glue to said roll, of a cover having an aperture for the roll, means for feeding bands one at a time across said cover and over said aperture, means for normally holding said cover in a raised position thus rendering the cover effective to hold a band resting on it out of contact with the roll, and means for depressing said cover and band to bring the part of the band overlying said aperture into contact with the roll.

16. In a machine of the character described, the combination with a glue applying roll and means for supplying glue to said roll, of a cover having an aperture for the roll, means for feeding bands one at a time across said cover and over said aperture, means for normally holding said cover in a raised position thus rendering the cover effective to hold a band resting on it out of contact with the roll, mechanism for depressing said cover and band to bring the part of the band overlying said aperture into contact with the roll, and connections between said roll and said mechanism for rotating the roll.

17. In a machine of the character described, the combination with a glue applying member and means for supplying glue to said member, of a cover having an aperture for the passage therethrough of said member, means for feeding bands across said cover and over said aperture one at a time, means for relatively moving said member and cover to cause said member to apply glue to the part of the band overlying said aperture, and means for holding the band in contact with said member when it is moved through said aperture.

18. In a machine of the character described, the combination with a glue applying roll and means for supplying glue to said roll, of a cover having an aperture for the passage therethrough of said roll, means for feeding bands one at a time across said cover and over said aperture, means for normally holding the cover in a raised position thus rendering the cover effective to hold a band resting on it out of contact with the roll, a presser foot and mechanism for operating said presser foot to cause it to press the band against the cover at opposite sides of said aperture and to depress said cover sufficiently to bring the band into contact with the surface of said roll.

In testimony whereof I have signed my name to this specification.

ELMER L. SMITH.